US 7,704,575 B2

(12) United States Patent
Uhlir-Tsang et al.

(10) Patent No.: US 7,704,575 B2
(45) Date of Patent: *Apr. 27, 2010

(54) ADDITIVES TO ELIMINATE BRONZING OF INK-JET INKS

(75) Inventors: Linda C. Uhlir-Tsang, Corvallis, OR (US); John R. Moffatt, Corvallis, OR (US); Tye J. Dodge, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/870,844

(22) Filed: Jun. 16, 2004

(65) Prior Publication Data

US 2005/0025915 A1 Feb. 3, 2005

Related U.S. Application Data

(63) Continuation-in-part of application No. 10/628,903, filed on Jul. 28, 2003.

(51) Int. Cl.
*B41M 5/40* (2006.01)

(52) U.S. Cl. ................. 428/32.34; 428/32.38; 347/105; 106/31.27; 106/31.6; 106/31.43; 106/31.75

(58) Field of Classification Search ............... 428/32.34, 428/32.38; 347/105; 106/31.27, 31.6, 31.43, 106/31.75
See application file for complete search history.

(56) References Cited

U.S. PATENT DOCUMENTS

| 5,062,893 | A | | 11/1991 | Adamic et al. | |
|---|---|---|---|---|---|
| 5,275,867 | A | | 1/1994 | Misuda et al. | |
| 5,389,133 | A | * | 2/1995 | Gundlach et al. | ........ 106/31.43 |
| 5,463,178 | A | | 10/1995 | Suzuki et al. | |
| 5,605,750 | A | | 2/1997 | Romano et al. | |
| 5,989,378 | A | | 11/1999 | Liu et al. | |
| 6,149,722 | A | | 11/2000 | Robertson et al. | |
| 6,187,430 | B1 | | 2/2001 | Mukoyoshi et al. | |
| 6,753,051 | B1 | * | 6/2004 | Landry-Coltrain et al. | ........................ 428/32.36 |
| 2001/0010891 | A1 | * | 8/2001 | Hotta et al. | ............... 430/271.1 |
| 2002/0013388 | A1 | * | 1/2002 | Shoji et al. | ................... 523/461 |
| 2002/0182380 | A1 | * | 12/2002 | Nagashima et al. | ......... 428/195 |
| 2003/0079646 | A1 | * | 5/2003 | Lee et al. | ................. 106/31.36 |
| 2003/0224129 | A1 | * | 12/2003 | Miyachi et al. | ............. 428/32.1 |
| 2004/0003755 | A1 | * | 1/2004 | Fukumoto et al. | ........ 106/31.58 |
| 2004/0138337 | A1 | * | 7/2004 | Hasegawa et al. | ............ 523/160 |
| 2009/0117278 | A1 | * | 5/2009 | Sadohara | ..................... 427/256 |

FOREIGN PATENT DOCUMENTS

| EP | 0 463 737 A2 | | 1/1992 |
|---|---|---|---|
| EP | 0 494 522 A1 | | 7/1992 |
| EP | 0 675 178 A2 | | 10/1995 |
| EP | 1 157 847 A1 | | 11/2001 |
| EP | 1405883 | | 7/2004 |
| EP | 1 462 490 A1 | | 9/2004 |
| JP | 4-110362 A | | 4/1992 |
| JP | 7-228810 A | | 8/1995 |
| JP | 7-331145 A | | 12/1995 |
| JP | 9-12949 A | | 1/1997 |
| JP | 11-5359 A | | 1/1999 |
| JP | 2001-341408 | * | 12/2001 |
| JP | 2001-341408 A | | 12/2001 |
| JP | 2004-149612 A | | 5/2004 |
| WO | WO 2005/012447 A1 | | 2/2005 |

\* cited by examiner

*Primary Examiner*—Betelhem Shewareged

(57) ABSTRACT

Anti-bronzing agents are added to ink-jet inks to prevent bronzing of the inks when printed on various types of media. The additive can be an amine anti-bronzing agent that is protonated when the ink-jet ink is printed on the print medium.

16 Claims, No Drawings

ADDITIVES TO ELIMINATE BRONZING OF INK-JET INKS

The present application is a continuation-in-part of U.S. patent application Ser. No. 10/628,903, filed on Jul. 28, 2003, the entirety of which is incorporated herein by reference.

FIELD OF THE INVENTION

The present invention is drawn to ink-jet inks used in printing. More particularly, the present invention is drawn to improved ink-jet inks in which bronzing on print media has been reduced or even eliminated.

BACKGROUND ART

Bronzing is a lustrous sheen of a printed sample in reflected light which can be associated with certain dyes. Specifically, bronzing refers to a reddish-brown reflected color of the ink upon drying. It is particularly an undesirable property of black inks because of lowered optical densities produced. However, it also can affect other colors such as cyan, producing a reddish tone. Additionally, bronzing is an undesirable print characteristic which can prevent color attributes from being measured.

One solution proposed to eliminate or reduce bronzing has been to raise the pH of the ink. However, it has been found that raising the pH of an ink can cause materials degradation of printheads that are used to jet the ink. Thus, an alternative means of reducing or even eliminating bronzing of ink-jet inks printed on print media would be an advancement in the art.

SUMMARY OF THE INVENTION

It has been recognized that certain additives can be included in ink-jet inks to reduce bronzing on photographic media, such as specialty fast-drying ink-jet photographic porous media or specialty slower-drying ink-jet photographic swellable media. In accordance with this recognition, an ink-jet printing system can comprise a print medium having an ink-receiving layer, and an ink-jet ink configured for printing on the ink-receiving layer. The ink-jet ink can comprise a liquid vehicle, a dye, and an amine anti-bronzing agent that is at least partially protonated when the ink-jet ink is printed on the ink-receiving layer. The anti-bronzing agent can be present in an effective concentration to at least reduce bronzing of the ink-jet ink printed on the ink-receiving layer.

In another embodiment, a method of reducing bronzing of an ink-jet ink printed on a print medium can comprise the step of jetting the ink-jet ink onto the print medium, wherein the print medium includes an ink-receiving layer. The ink-jet ink can comprise a liquid vehicle, a dye, and an amine anti-bronzing agent that is at least partially protonated when the ink-jet ink is printed on the ink-receiving layer. The anti-bronzing agent can be present in an effective concentration to at least reduce bronzing of the ink-jet ink printed on the ink-receiving layer.

Additional features and advantages of the invention will be apparent from the detailed description which follows, taken in conjunction with the accompanying drawings, which together illustrate, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

As used herein, "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as polymers, UV curable materials, plasticizers, and/or co-solvents in some embodiments.

The term "anti-bronzing agent" herein includes compositions that are added to ink-jet inks to prevent bronzing when the ink is printed on a print medium. In a first general embodiment, the anti-bronzing agent can include an amine composition that is at least partially protonated when the ink-jet ink is applied to a print medium. In other words, the aqueous pKa of the amine can be greater than the pH of the ink once applied to the medium, or alternatively, slightly less than, e.g., no more than about 1 pH unit lower, than the pH of the ink applied to the medium, such that at least a relatively significant portion of the amines are still protonated on the medium. Such amine compositions, when added at appropriate concentrations, can act to deaggregate dyes on media that are prone to bronzing. The act of promoting deaggregation of these dyes when printed on ink-receiving layers of print media can reduce bronzing. With respect to levels of bronzing reduction, the teachings herein permit reduction of bronzing to acceptable levels or even elimination of bronzing of ink-jet inks printed on print media. Advantages of the teachings herein over other approaches, such as increasing the pH of the ink, include that pH-sensitive materials in the printhead are not jeopardized, and that there is a relatively wide range of compounds that can be utilized in practice of the embodiments described herein.

The term "protonated" or "at least partially protonated," when referring to amine compositions, indicates that the pKa value of the amine is either greater than the pH value of the ink-jet ink once printed on the print medium, or alternatively, is slightly lower, e.g., no more than about 1 pH unit lower, than the pH of the ink-jet ink once printed on the print medium, such that at least a relatively significant portion of the amines are protonated on the print medium. Depending on the relative values, substantially all of the amines can be protonated, or a significant plurality of the amines can be protonated.

"pKa" is defined as the pH at which half of a composition is protonated and half is deprotonated. As the pH is increased, fewer molecules are protonated. Likewise, as the pH is decreased, more molecules will be protonated. For example, one can consider the amine anti-bronzing agents of the present invention which have fixed pKa values (experimentally determined). For every whole unit of increased pH of the composition containing the amine anti-bronzing agent compared to the pKa value of the amine anti-bronzing agent itself, there will be 10 times fewer protonated amines present. Thus, in accordance with one embodiment of the present invention, the pKa can either be higher than the pH of the ink-jet printed on the print medium, or alternatively, can be as much as 1 unit lower than the pH of the ink-jet printed on the print medium. In either case, the amine anti-bronzing agent can still be considered to be "protonated" or "at least partially protonated" in accordance with embodiments of the present invention.

When referring to "protonated amines" or "partially protonated amines," these compositions are included in ink-jet inks to inhibit bronzing. However, bronzing is a phenomenon that occurs not while an ink is in a liquid state, such as while being stored in ink-jet architecture, but is a phenomenon that occurs once the ink is printed on print media. Thus, it is the pH of the ink-jet ink composition after printing on the print medium that is relevant as to whether the pH value and the pKa value meets the criteria of the present invention. For example, an amine anti-bronzing agent having a pKa of about 5 that is printed with an ink-jet ink onto a print medium having a pH of 6 may not prevent bronzing, whereas the same ink-jet ink containing the same amine anti-bronzing agent printed on a print medium having a pH of about 4 may prevent bronzing. This may be explained in that a print medium having a lower pH would more likely lower the pH of the ink-jet ink/print medium combination (once combined to form a printed image), thus providing a greater degree of amine protonation. Of course, this example is not definitive for every situation, as relative concentrations of both ink and media components can also play a role in whether bronzing occurs as well. As a result, it is to be noted that, in one embodiment, it is the pH of the ink-jet ink combined with the pH of the print medium that determines whether the amine is protonated enough to deaggregate the ink-jet ink dye to an extent that reduces bronzing of the printed image. In another embodiment, the pH of the print medium may be less relevant if there is a great enough difference between the pKa of the amine anti-bronzing agent and the pH of the ink. However, in either case, the protonation of the amine is more relevant with respect to the ink-jet ink printed on the print medium in predicting whether anti-bronzing will result.

The term "about" when referring to a numerical value or range is intended to encompass the values resulting from experimental error that can occur when taking measurements.

As used herein, "effective amount" or "effective concentration" refers to at least the minimal amount of a substance or agent, which is sufficient to achieve a desired effect. For example, an effective amount of an "ink vehicle" is at least the minimum amount required in order to create an ink composition, while maintaining properties necessary for effective ink-jetting.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In accordance with the present invention, an ink-jet printing system can comprise a print medium having an ink-receiving layer, and an ink-jet ink configured for printing on the ink-receiving layer. The ink-jet ink can comprise a liquid vehicle, a dye, and an amine anti-bronzing agent that is at least partially protonated when the ink-jet ink is printed on the ink-receiving layer. The anti-bronzing agent can be present in an effective concentration to at least reduce bronzing of the ink-jet ink printed on the ink-receiving layer.

In another embodiment, a method of reducing bronzing of an ink-jet ink printed on a print medium can comprise the step of jetting the ink-jet ink onto the print medium, wherein the print medium includes an ink-receiving layer. The ink-jet ink can comprise a liquid vehicle, a dye, and an amine anti-bronzing agent that is at least partially protonated when the ink-jet ink is printed on the ink-receiving layer. The anti-bronzing agent can be present in an effective concentration to at least reduce bronzing of the ink-jet ink printed on the ink-receiving layer.

With respect to the above embodiments, i) the amine can be sufficiently protonated in the ink-jet ink to reduce bronzing irrespective of the pH of the medium, ii) the amine can become sufficiently protonated on the print medium to reduce bronzing due to the lower pH of the print medium, or iii) or the amine can maintain sufficient protonation upon printing on the print medium to reduce or eliminate bronzing. Thus, how the amine is or becomes protonated in the ink once printed on the print medium is less important than the fact that the final printed image includes amines that are sufficiently protonated to reduce bronzing. To determine whether bronzing is reduced, one can compare bronzing of an anti-bronzing agent-containing ink-jet ink printed on a media substrate to an ink-jet ink that does not include the anti-bronzing agent printed on the same media type.

The effective concentration of the amine anti-bronzing agent can be an amount that reduces an aggregation state of the dye when the ink-jet ink is printed on the ink-receiving layer, as it is typically dye aggregation that causes bronzing on various types of photo media. This being stated, the addition of too much anti-bronzing agent can also act to aggregate a dye when printed on print media. The concentration range that can be used to reduce bronzing is, to some degree, case specific. Thus, when determining how much of the anti-bronzing agent to add to an ink-jet ink, several considerations can be made, such as the type and amount of dye present, the type of anti-bronzing agent to be added, and the type and amount of liquid vehicle components present. Determining how much anti-bronzing agent to add would be easily ascertainable to one skilled in the art after considering the present disclosure. As a general rule, concentrations in the range of 0.2 wt % to 30 wt % of anti-bronzing agent provide acceptable results.

If the anti-bronzing agent selected for use is to be an amine in accordance with embodiments of the present invention, then an amine can be selected that has a pKa that is greater than the pH of the ink-jet medium. Alternatively, if the amine has a lower pKa than the pH of the medium, the pKa should only be slightly lower such that at least a relatively significant portion of the amine additives are protonated, e.g., a pKa value no more than about 1 pH unit lower than the pH of the ink-jet ink once printed on the print medium. Examples of amines that can be protonated and used in accordance with embodiments of the present invention are alkylamines, including as ethylamine derivatives; ammonia; ethanolamines, including ethanolamine derivatives; pyridines; naphthalenes, morpholines, amino acids; and mixtures thereof. Specifically, triethylamine, triethanolamine, methylmorpholine, morpholine, 1,8-bis(dimethylamino) naphthalene, and pyridylcarbinol have each been found to reduce bronzing at various concentration ranges with various dye-types. A quaternary amine is an example of composition that is not included as an effective anti-bronzing agent, as quaternary amines do not cause appropriate deaggregation behavior.

Thus, as mentioned, amines can be added to the ink-jet inks such that the pKa of the amine is greater than or slightly less than the pH of the ink-jet on the print medium. Regardless of which system is used, amines having a pKa (experimentally determined) above the pH of the print media can be preferred for use. As lower pH print media is more common than higher pH print media, the use of amines can provide a means for printing on more acidic print media without causing bronzing. With higher pH print media, the problems associated with bronzing are less prevalent. Thus, controlling the bronzing by inclusion of these additives in the ink, particularly when printing on more acidic print media, is beneficial. Without subscribing to any particular theory, it appears that the presence of the protonated amine anti-bronzing agent may serve to prevent a more acidic print media from aggregating the dye.

Aside from the anti-bronzing agent, the balance of the ink-jet ink can include conventional co-solvents (organic and aqueous) and at least one dye in the conventional ranges disclosed elsewhere; see, e.g., U.S. Pat. No. 6,177,485, the contents of which are incorporated herein by reference, for a list of suitable co-solvents and dyes and concentration ranges thereof for ink-jet inks. It will be appreciated that not all dyes result in bronzing on the coated print media discussed herein. However, where any such dye used in ink-jet printing is found to bronze, the present teachings provide an approach to eliminating such bronzing.

More specifically with respect to the liquid vehicle, the ink-jet ink compositions of the present invention are typically prepared in an aqueous formulation or liquid vehicle which can include water, cosolvents, surfactants, buffering agents, biocides, sequestering agents, viscosity modifiers, humectants, and/or other known additives. In one aspect of the present invention, the liquid vehicle can comprise from about 70 wt % to about 99.9 wt % by weight of the ink-jet ink composition. In another aspect, other than the colorant, liquid vehicle can also carry polymeric binders, latex particulates, and/or other solids.

As described, cosolvents can be included in the ink-jet compositions of the present invention. Suitable cosolvents for use in the present invention include water soluble organic cosolvents, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Cosolvents can be added to reduce the rate of evaporation of water in the ink-jet to minimize clogging or other properties of the ink such as viscosity, pH, surface tension, optical density, and print quality. The cosolvent concentration can range from about 0.01 wt % to about 40 wt %, and in one embodiment is from about 5 wt % to about 15 wt %. Multiple cosolvents can also be used, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.1 wt % to about 0.25 wt %.

One or more of various surfactants can also be used as are known by those skilled in the art of ink formulation. Non-limiting examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, commercial products such as TERGITOLS, SURFYNOLS, ZONYLS, TRITONS, MERPOLS, and combinations thereof. The amount of surfactant added to the ink-jet inks of this invention can range from 0 wt % to 10 wt %.

In one embodiment of the present invention, the ink-jet ink can be configured for application from a thermal ink-jet pen. Thermal ink-jet systems are quite different in their jetting properties than piezo ink-jet systems. As such, compositions that are effective for use in piezo ink-jet systems are not necessarily effective for use with thermal ink-jet ink systems. However, the converse is not necessarily true. In other words, polymers that work well with thermal ink-jet systems are more likely to work with piezo systems than vice versa. Therefore, the selection of liquid vehicle or other additives for use with thermal ink-jet systems often requires more care, as thermal ink-jet systems are less forgiving than piezo ink-jet systems.

Examples of dyes benefiting from the teachings herein include, but are not limited to, Direct Blue 199 (CI 74180), Black 287 (Projet Fast Black 2), as well as other dyes described generally in U.S. Pat. No. 5,062,893, to name a few. It is to be emphasized that the concentration of components in the ink is to be made on a case by case basis. More specifically, the concentration and selection of the type of the anti-bronzing agent can depend on identity of dye, concentration of dye, the pKa of the dye, the vehicle components present, the pH of the ink, the pKa of the amine, the pH of the media, the type of media, etc. Such a determination of concentration is not considered to be undue, since the pKa values of most commonly used additives are known and published, or can be determined by simple titration, and determining the pH of both the print media and the ink is easily done with a pH meter. To illustrate an example of such a process, once can consider the difference between DB199 and Black 287 dyes. DB199 is a phthalocyanine dye that is more sensitive amine salts than Black 287. Therefore, less anti-bronzing additive, e.g., amine, may be required in some embodiments to achieve an anti-bronzing result. Additionally, the inclusion of more anti-bronzing agent than is necessary may also have adverse results. In other words, either too high or too low of a concentration of an anti-bronzing agent can lead to dye destabilization, and thus, concentrations can be determined on a case by case basis.

In addition to the dependency of ink-jet ink components, there also may be a dependency of ink bronzing on the nature of the print media. For example, many dyes that do not evidence bronzing on plain paper are found to evidence bronzing on other types of print media, such as photopaper that includes a photobase substrate, a quick-drying ink-receiving layer coated thereon comprising an inorganic pigment (e.g., silica or alumina) and binder, and an optional topcoat. Thus, ink systems can be prepared while considering the types of media that these ink systems will be used with.

When referring to the ink-receiving layer of a print medium, this can include any coating that is used to accept an ink-jet ink to produce an image. There are at least two types of ink-receiving layers that can be used, including metal oxide or semi-metal oxide particulate-based ink-receiving layers, e.g., alumina- or silica-based, and polymeric swellable ink-receiving layers, e.g., gelatin or polyvinyl alcohol. The media substrate, for example, can be paper, plastic, coated paper, fabric, art paper, or other known substrate used in the ink-jet printing arts. In one embodiment, photobase can be used as the substrate. Photobase is typically a three-layered system comprising a single layer of paper sandwiched by two polymeric layers, such as polyethylene layers.

With respect to the ink-receiving layer, if a semi-metal oxide or metal oxide particulate-based ink-receiving layer is used; inorganic semi-metal or metal oxide particulates, a polymeric binder, and optionally, mordants and/or other porous coating composition agents can be present. In one embodiment, the inorganic semi-metal or metal oxide particulates can be silica, alumina, boehmite, silicates (such as aluminum silicate, magnesium silicate, and the like), titania, zirconia, calcium carbonate, clays, and combinations thereof. In a more detailed aspect, the particulates can be alumina, silica, or aluminosilicate. Each of these inorganic particulates can be dispersed throughout a porous coating composition, which can be applied to a media substrate to form the porous ink-receiving layer. The semi-metal oxide or metal oxide particulates can be chemically surface-modified using silane coupling agents having functional moieties attached thereto.

Turning to the organic swellable ink-receiving layer that can be coated on the media substrate, hydrophilic compositions such as gelatin, polyvinyl alcohol, methyl cellulose, or the like can be applied. These compositions are polymeric in nature, and when an ink-jet ink is printed thereon, the polymeric coating that makes up the ink-receiving layer absorbs and traps the ink. These hydrophilic polymeric materials can be coated on a single side of a media substrate, or can be coated on both sides of a media substrate to provide a good printing surface for ink-jet ink applications, as well as to provide balance to the back of the substrate, preventing substrate curl that may occur with a paper substrate. Backcoats can also be applied to the media to prevent ink-transfer when stacking media after printing. An example of such media is described in U.S. Pat. No. 6,638,585, which is incorporated herein by reference.

The ink-receiving layer, whether primarily inorganic porous or organic swellable, can be a single layer or a multi-layer coating designed to adsorb or absorb sufficient quantities of ink to produce high quality printed images. The coating composition may be applied to the media substrate to form the ink-receiving layer by any means known to one skilled in the art, including blade coating, air knife coating, rod coating, wire rod coating, roll coating, slot coating, slide hopper coating, gravure, curtain, and cascade coating. The ink-receiving layer can be printed on one or both sides of the media substrate

EXAMPLES

The following examples illustrate embodiments of the invention that are presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what is presently deemed to be the most practical and preferred embodiment of the invention.

Example 1

Two typical ink-jet ink compositions were prepared, one including Black 287 (Projet Fast Black 2) (Ink 1) and the other containing DB199Na (CI 74180) (Ink 2). Each of these two ink-jet inks was divided into six equal volumes for a total of 12 ink-jet ink volumes; six including Black 287 (Inks 1a, 1b, 1c, 1d, 1e, and 1f) and six including DB199Na (Inks 2a, 2b, 2c, 2d, 2e, and 2f). Inks 1a and 2a were not further modified, providing a baseline or control for determining bronzing improvement of the other inks. Inks 1 b-f and 2b-f were each modified with an amine anti-bronzing agent; namely 1b and 2b were each modified with methylmorpholine, 1c and 2c were each modified with morpholine, 1d and 2d were each modified with 1,8-bis(dimethylamino)naphthalene, 1e and 2e were each modified with triethylamine, and 1f and 2f were each modified with 3-pyridylcarbinol. All of the ink-jet inks prepared had a pH from about 8 to 8.5. The print media used for the study were 1) an experimental photopaper comprising a photobase substrate and a silica-based ink-receiving layer having a pH of about 4 coated thereon (referred to as "porous media") and 2) a polyvinyl alcohol coated swellable media having a pH of about 6, which is sold commercially as HP Premium Plus Photo Paper, Glossy (referred to as "swellable media"). Both of these print media types are used in color ink-jet printing to provide the equivalent of photographic prints. With respect to the porous media, silica coatings on print media are disclosed in U.S. Pat. Nos. 5,275,867; 5,463,178; 5,576,088; 5,605,750; 5,989,378; and 6,187,430, the contents of which are incorporated herein by reference. Tables 1 and 2 indicate the results of the study, as follows:

TABLE 1

Relationship between pKa of amine, pH of ink on print media, and bronzing for Black 287 dye-containing ink-jet inks

| Ink | Additive | pKa | Swellable Media: Improvement? | Porous Media: Improvement? |
|---|---|---|---|---|
| Ink 1a | None | — | Bronzing control | Bronzing control |
| Ink 1b | Methylmorpholine | 7.13 | Yes | Yes |
| Ink 1c | morpholine | 8.33 | Yes | Yes |
| Ink 1d | 1,8-bis(dimethylamino) naphthalene | 12.37 | Yes | Yes |
| Ink 1e | triethylamine | 10.72 | Yes | Yes |
| Ink 1f | pyridylcarbinol | ~5 | No | Yes |

TABLE 2

Relationship between pKa of amine, pH of ink on print media, and bronzing for DB199Na dye-containing ink-jet inks

| Ink | Additive | pKa | Swellable Media: Improvement? | Porous Media: Improvement? |
|---|---|---|---|---|
| Ink 2a | None | — | Bronzing baseline | Bronzing baseline |
| Ink 2b | Methylmorpholine | 7.13 | Yes | Yes |
| Ink 2c | morpholine | 8.33 | Yes | Yes |
| Ink 2d | 1,8-bis(dimethylamino) naphthalene | 12.37 | Yes | Yes |

As can be seen by Tables 1 and 2, by not including an amine additive, bronzing occurred, which provided a bronzing control for comparison purposes. However, by including an amine additive that was protonated when the ink-jet ink was printed on the print medium, bronzing was reduced or improved. The only exception in this study with respect to bronzing improvement occurred when Ink 1f was printed on swellable media. As the pH of the media was higher than the pKa of the pyridylcarbinol additive, the amine was not protonated enough on the print medium to deaggregate the dye, and thus, bronzing was not improved.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. An ink-jet printing system, comprising:
   a) a print medium having an ink-receiving layer, the ink receiving layer being selected from the group consisting of a metal oxide particulate-based coating, a semi-metal oxide particulate-based coating, and a polymeric swellable coating; and
   b) an ink-jet ink configured for printing on the ink-receiving layer, said ink-jet ink comprising:
      i) a liquid vehicle,
      ii) a water soluble dye, and
      iii) an amine anti-bronzing agent that is at least partially protonated when the ink-jet ink is printed on the ink-receiving layer, said anti-bronzing agent being present at from about 0.2 wt % to 30 wt % and in an effective concentration to at least reduce bronzing of the ink-jet ink printed on the ink-receiving layer, wherein the amine anti-bronzing agent is selected from the group consisting of ethylamines, ammonia, pyridines, naphthalenes, morpholines, amino acids, and mixtures thereof, and wherein (a) the amine anti-bronzing agent has a pKa value no more than 1 pH unit less than the pH value of the ink-jet ink printed on the ink-receiving layer, or (b) the amine anti-bronzing agent has a pKa value that is greater than a pH value of the ink-receiving layer.

2. A system as in claim 1, wherein the amine anti-bronzing agent has a pKa value that is higher than a pH value of the ink-jet ink printed on the ink-receiving layer.

3. A system as in claim 1, wherein the amine anti-bronzing agent has a pKa value no more than 1 pH unit less than the pH value of the ink-jet ink printed on the ink-receiving layer.

4. A system as in claim 1, wherein the amine anti-bronzing agent has a pKa value that is greater than a pH value of the ink-receiving layer.

5. A system as in claim 1, wherein the amine anti-bronzing agent has a pKa value that is greater than the pH of the ink-jet ink printed on the print medium, and wherein the amine anti-bronzing agent has a protonated form which disrupts dye aggregation once the ink-jet ink is printed on the ink-receiving layer.

6. A system as in claim 1, wherein the metal oxide or semi-metal oxide particulate-based based coating is alumina- or silica-based coating.

7. A system as in claim 1, wherein the amine anti-bronzing agent is selected from the group consisting of triethylamine, methylmorpholine, morpholine, 1,8-bis(dimethylamino) naphthalene, and pyridylcarbinol.

8. A method of reducing bronzing of an ink-jet ink printed on a print medium, comprising jetting the ink-jet ink onto the print medium, said print medium including an ink-receiving layer, said ink-jet ink, comprising:
   a) a liquid vehicle,
   b) a water soluble dye, and
   c) an amine anti-bronzing agent that is at least partially protonated when the ink-jet ink is printed on the ink-receiving layer, said anti-bronzing agent being present at from about 0.2 wt % to 30 wt % and in an effective concentration to at least reduce bronzing of the ink-jet ink printed on the ink-receiving layer, wherein the amine anti-bronzing agent is selected from the group consisting of ethylamines, ammonia, pyridines, naphthalenes, morpholines, amino acids, and mixtures thereof, wherein said ink receiving layer is selected form the group consisting of metal oxide particulate-based coating, a semi-metal oxide particulate-based coating, and a polymeric swellable coating, and wherein (i) the amine anti-bronzing agent has a pKa value no more than 1 pH unit less than the pH value of the ink-jet ink once printed in the ink-receiving layer, or (ii) the amine anti-bronzing agent has a pKa value that is greater than the pH value of the ink-receiving layer.

9. A method as in claim 8, wherein the amine anti-bronzing agent has a pKa value that is greater than the pH value of the ink-jet ink once printed on the ink-receiving layer.

10. A method as in claim 8, wherein the amine anti-bronzing agent has a pKa value no more than 1 pH unit less than the pH value of the ink-jet ink once printed in the ink-receiving layer.

11. A method as in claim 8, wherein the amine anti-bronzing agent has a pKa value that is greater than the pH value of the ink-receiving layer.

12. A method as in claim 8, wherein the amine anti-bronzing agent has a pKa value that is greater than the pH of the ink-jet ink printed on the print medium, and wherein the amine anti-bronzing agent has a protonated form which disrupts dye aggregation once the ink-jet ink is printed on the ink-receiving layer.

13. A method as in claim 8, wherein the metal oxide or semi-metal oxide particulate-based based coating is alumina- or silica-based coating.

14. A method as in claim 8, wherein the amine anti-bronzing agent is selected from the group consisting of triethylamine, methylmorpholine, morpholine, 1,8-bis(dimethylamino) naphthalene, and pyridylcarbinol.

15. An ink-jet printing system, comprising:
   a) a print medium having an ink-receiving layer, the ink receiving layer being selected from the group consisting of a metal oxide particulate-based coating, a semi-metal oxide particulate-based coating, and a polymeric swellable coating; and
   b) an ink-jet ink configured for printing on the ink-receiving layer, said ink-jet ink comprising:
      i) a liquid vehicle,
      ii) a water soluble dye, and
      iii) an amine anti-bronzing agent that is at least partially protonated when the ink-jet ink is printed on the ink-receiving layer, said anti-bronzing agent being present at from about 0.2 wt % to 30 wt % and in an effective concentration to at least reduce bronzing of the ink-jet ink printed on the ink-receiving layer, and wherein the amine anti-bronzing agent is selected from the group consisting of triethylamine, methylmorpholine, morpholine, 1,8-bis(dimethylamino) naphthalene, and pyridylcarbinol.

16. A method of reducing bronzing of an ink-jet ink printed on a print medium, comprising jetting the ink-jet ink onto the print medium, said print medium including an ink-receiving layer, said ink-jet ink, comprising:
   a) a liquid vehicle,
   b) a water soluble dye, and
   c) an amine anti-bronzing agent that is at least partially protonated when the ink-jet ink is printed on the ink-receiving layer, said anti-bronzing agent being present at from about 0.2 wt % to 30 wt % and in an effective concentration to at least reduce bronzing of the ink-jet ink printed on the ink-receiving layer, wherein the amine anti-bronzing agent is selected from the group consisting of triethylamine, methylmorpholine, morpholine, 1,8-bis(dimethylamino) naphthalene, and pyridylcarbinol, and wherein said ink receiving layer is selected form the group consisting of metal oxide particulate-based coating, a semi-metal oxide particulate-based coating, and a polymeric swellable coating.

* * * * *

UNITED STATES PATENT AND TRADEMARK OFFICE
CERTIFICATE OF CORRECTION

PATENT NO. : 7,704,575 B2  Page 1 of 1
APPLICATION NO. : 10/870844
DATED : April 27, 2010
INVENTOR(S) : Linda C. Uhlir-Tsang et al.

It is certified that error appears in the above-identified patent and that said Letters Patent is hereby corrected as shown below:

In column 10, line 45, in Claim 8, delete "form" and insert -- from --, therefor.

In column 12, line 22, in Claim 16, delete "form" and insert -- from --, therefor.

Signed and Sealed this
Seventh Day of June, 2011

David J. Kappos
*Director of the United States Patent and Trademark Office*